Figure 1:
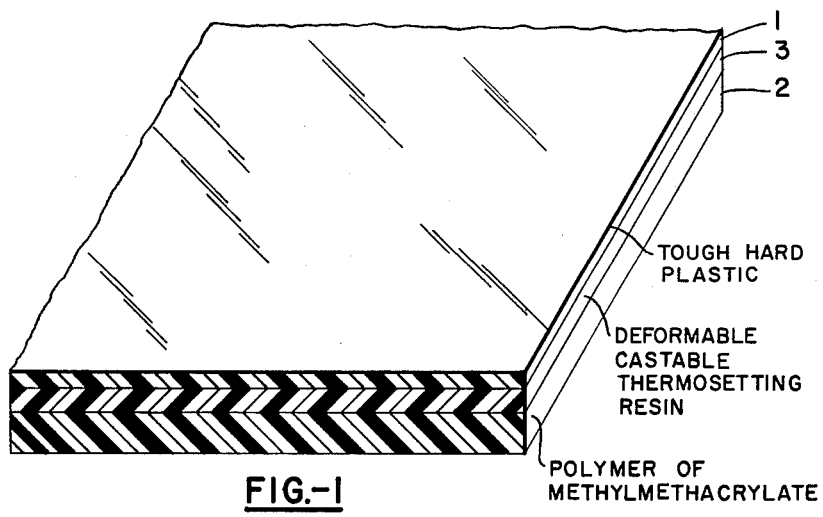

INVENTORS.
RALPH A. BURKLEY
DONALD C. CULLY
JOHN L. FOLK
BY R.L. Miller
ATTORNEY

3,135,645
LAMINATES

Ralph A. Burkley, Cuyahoga Falls, and Donald C. Cully and John L. Folk, Akron, Ohio, assignors to Goodyear Aerospace Corporation, a corporation of Delaware
Filed Dec. 5, 1958, Ser. No. 778,414
6 Claims. (Cl. 161—165)

This invention relates to multiple ply laminates and is particularly concerned with the fabrication of laminates which are resistant to thermal and structural distortion.

Multiple ply laminates have been prepared from various compositions such as various resins combined with various other structural materials for various uses. For example, it is well known in the art to use resinous rigid foam cores to adhere various skins together. The skins may be metal, glass, or various resins which may be further strengthened by reinforcing elements such as fiber glass. It is also known to adhere various skins together by means of various adhesives to form laminates.

These known laminates have not been completely successful for use in connection with the fabrication of high speed aircraft and missile components. Because of the high speeds encountered, elemental erosion becomes a problem which must be overcome by means of very hard rigid compositions. However, such compositions tend to shatter easily upon impact with various particles which are present in the atmosphere. Aircraft speeds above the velocity of sound cause the air immediately next to the aircraft surface to be heated as it is brought from a state of rest to the velocity of the aircraft. The magnitude of such heating is sufficient to bring about problems in cooling of aircraft components. This is particularly true in the case of aircraft enclosure components inasmuch as they have large surface areas and are customarily made of conventional transparent plastic materials having relatively low heat resistance, e.g., 200° F. to 225° F. As aircraft speeds approach Mach 2, canopy surface temperatures for steady state flight may surpass the temperature limits of conventional plastic canopy materials, and if it were not for the cockpit cooling system the canopy would deform or fail under the high internal operating pressures and airloads. As aircraft speeds exceed Mach 2 and may approach Mach 3, canopy surface temperatures may reach 300–400° F. which exceeds the limits of conventional plastic canopy materials and the cooling equipment requirements for steady state flight becomes so large as to render continuous flight speeds in this range impractical at the present time. In an effort to overcome the problem, various high temperature canopy materials have been developed. Unfortunately, such materials have been shown to be limited in usefulness because their impact characteristics are unsatisfactory under operational loading conditions.

It is an object of this invention to prepare laminates which are operative under extreme ranges of temperatures. It is also an object of this invention to provide laminates which are capable of withstanding extremes of structural distortion and which are capable of remaining intact when the outer layer has become deformed, or shattered. It is a further object of this invention to prepare laminates which are comprised of skins which are spaced apart by means of a deformable resin layer. It is another object of this invention to provide useful laminates by casting deformable thermosetting resins between spaced-apart skins.

In the practice of this invention, laminates comprised of tough, hard, substantially rigid skins adhered together in spaced-apart relation by means of layers of tough, substantially non-rigid deformable resins are prepared by casting a layer of tough, substantially non-rigid, deformable resin between spaced-apart tough, hard, substantially rigid skins.

Figure 2:
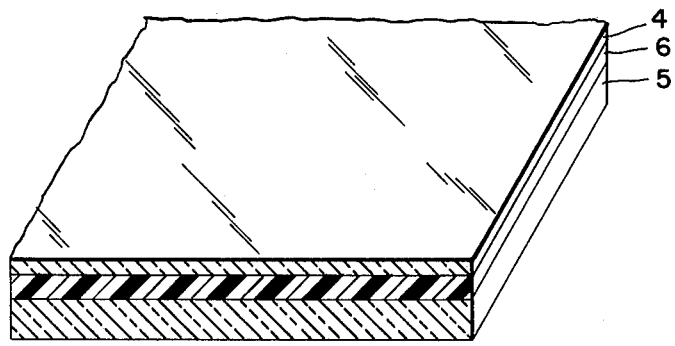

In the drawings:

FIG. 1 is a perspective cross-sectional view of a laminate of the invention utilizing plastic skins; and FIG. 2 is a perspective cross-sectional view of a laminate of another embodiment of the invention utilizing glass skins.

In FIGURE 1, outer skins 1 and 2 as depicted are overlaid in congruent manner and spaced apart by an intermediate layer 3. The skins 1 and 2 are of rigid resinous material as contrasted with the intermediate layer 3 which is of a flexible resinous material. Although a detailed description of the materials of the laminate of the invention follows hereinafter, it is advisable in the interests of clarity in understanding the scope of the invention to consider broadly one example of the laminate of FIG. 1 which has useful properties; namely, an airplane canopy wherein the skin 1 is on the outer airstream side and the skin 2 is on the cockpit or inner side of the canopy. In a canopy for high-speed aircraft, it is important that the canopy material be shatter-resistant and also have good resistance to the elevated temperatures of the boundary layer generated at the high air speeds prevalent in the operation of modern aircraft. Such a combination of properties is not available presently in a monolithic plastic or a combination of plastic materials. Utilizing the laminate of the invention, and referring to FIG. 1, the skin 1 may be selected from a class of plastics having good temperature resistance and the skin 2 may be selected from a class of plastics having shatter-proof and/or high strength properties. Combining these two skins with a resinous layer 3 results in a laminate having the desired properties.

In FIG. 2, outer skins 4 and 5 are placed in spaced congruent relationship similar to the arrangement of the skins of FIG. 1; the skins 4 and 5 being of glass. An intermediate layer 6 of a resinous material is interposed between the skins 4 and 5 to form a laminate representing another embodiment of the invention. An example of a useful laminate of FIG. 2 from a broad viewpoint in better understanding the invention is that where the glass skin 4 is temperature-resistant and the glass skin 5 is shatter-resistant. The combination of such properties in skins 4 and 5 in a laminate with an interposed layer 6 of flexible resinous material provides a laminate having obvious utility in many applications such as side windows or ports in high-speed aircraft.

The skins of the laminates of this invention may be the same or different materials and will be selected in view of the use intended for the laminate. The skins must be of a tough, hard, substantially rigid composition which can be machined or molded in order to make the laminates adaptable for various uses. Also, the skins must be inherently capable of adherence with the flexible thermosetting resins which will be cast beween at least two skins to form a laminate. Materials which are useful as skin materials may be any of the known hard resinous compositions such as polymethylmethacrylate, polystyrene, allyl glycollate polymers, copolymers of allyl digylcol carbonate and acrylic monomers, mixtures of polyester resins and unsaturated monomers, epoxy resins, and alkyd resins.

In preparing the laminates, the skins may be the same or different compositions and selection of the skins will, of course, depend on the use intended for the finished laminate. For example, in prepared canopies for high speed aircraft, the outer skins must be transparent, abrasion resistant, and able to withstand extremes of thermal and structural distortion whereas the inner skins should display high strength and resist cracking. In preparing such a laminate, the inner skin which will be exposed to the cockpit will customarily be fabricated from a composition having known high strength and high crack propagation resistance properties such as polymethylmethacrylate, alkyd resins, etc. Polymethylmethacrylate compounds, marketed as Lucite by E. I. du Pont de Nemours and Co., Inc., and Plexiglas, marketed by Rohm and Haas Company, have proved to be useful in this regard. The outer skin, which will be exposed to the atmosphere will customarily be fabricated from a composition which is uniquely resistant to temperature deformation and which may also act as an insulating layer. For example, Selectron 400, marketed by The Pittsburgh Plate Glass Company, Sierracin 880 and Sierracin 890, marketed by Sierracin Corporation, are particularly useful for this purpose. These compositions are mixtures of two or more monomers, at least one of which forms a thermoplastic when polymerized alone and at least one other of which forms a thermosetting polymer when polymerized alone, e.g., mixtures of styrene, vinyl toluene, etc., with maleic anhydride glycerol polyesters, etc. Thus, it is obvious that tailor-made laminates, suitable for particular uses, may be fabricated by spacing apart, by means of a layer of flexible resin, various skins having particular properties.

The intermediate layer 3 may be selected from any castable thermosetting resin. Such resins may cure at room temperature, but are usually cured at elevated temperatures which are usually kept below 300° F. The resins must be capable of curing to a tough, non-rigid, deformable, resinous layer and must readily adhere to any of the various skin compositions. These intermediate layer resins may be selected from various resins which remain flexible after being cured such as flexible polyester resins, flexible epoxy resins, polyamide modified epoxy resins, polysulfide modfied epoxy resins, and cross-linked flexible acrylic resins.

The flexible polyester resins may be described as condensation products of polybasic acids and polyols, including the alkyd resins which are condensation products of polyhydric alcohols and polycarboxylic acids. Representative polyhydric alcohols which can be used in preparing alkyd resins for use in the practice of this invention are ethylene glycol, triethylene glycol, propylene glycol, 1,4 butene diol, dipropylene glycol, hexamethylene glycol, pinacol and glycerol. Representative polycarboxylic acids which can be used in preparing alkyd resins by reaction with any of the above-mentioned polyhydric alcohols and others are phthalic, isophthalic, terephthalic, succinic, adipic, sebacic, maleic, fumaric 2-phenylglutaric, citric, citraconic, mesaconic, itaconic, oxalic, malonic, glutaric, pimelic, suberic, azelaic, and sebacic acids. When a mixture of acids is used, it is necessary to use at least one unsaturated acid. In cases where unsaturated polyols are used, this may not be necessary. It is also possible to substitute ester-forming derivatives, such as the anhydrides, the simple esters and the like for the acids themselves. Also certain monofunctional modifiers can be incorporated in the resin according to the known art.

Particular flexible polyester resin systems are known to be mixtures of a cross-linking monomer, such as polystyrene, and an unsaturated alkyd resin with adjusted spatial relationship of cross-linking points to yield a cured flexible product. Alkyd resins of this type usually are formed by reacting any of a group of diols, such as an ethylene glycol, with a mixture of an unsaturated dibasic acid or anhydride, such as maleic anhydride, and a saturated dibasic acid or anhydride, such as adipic acid. The degree of flexibility may be governed by the choice of acid for the reaction mixture and/or by varying the percentages of saturated and unsaturated acids used in the reaction mixture. An example of such flexible polyester resins is Selectron 5208, marketed by Pittsburgh Plate Glass Company, which is essentially a mixture of 50 parts by weight of styrene and 50 parts by weight of a polyester made from adipic acid, maleic anhydride and diethylene glycol.

A class of particularly useful resins are the Paraplex resins marketed by Rohm and Haas Company. These resins are described in a book entitled "Paraplex P-Series Resins," published by the Resinous Products Division of Rohm and Haas Company, Philadelphia, Pennsylvania, in 1956. It has been discovered that Paraplex P–13 is particularly useful as an interlayer material in the fabrication of laminates which are useful as transparent canopies, windshields, and radomes. Paraplex P–13 is a resinous mixture comprised of about 50% by weight of styrene and about 50% by weight of a polyester, e.g., a polyester made by reacting maleic acid or maleic anhydride with saturated acids such as adipic acid and any of the various diols such as ethylene glycol. Also, various other styrene modified polyester resins may be used as the inner layer in fabricating laminates.

Epoxy resins which may be modified so as to remain flexible after curing may be described as the reaction products of polyphenolic compounds and epoxy compounds such as epichlorhydrin. Cross-linking forms the thermosetting polymers. Polymerization is normally induced by means of organic polyamines. Such epoxy resins may be further modified with small amounts of various other types of resins such as urea formaldehyde, phenol formaldehyde and melamine formaldehyde, or they may be esterified with various fatty acids and vegetable oil acids. Particularly useful epoxy resins may be described as linear polymers obtained as reaction products of epichlorhydrin and bisphenol A. Physical characteristics, whether liquid or solid, are determined by the degree of polymerization or average molecular weight. These epoxy resins may be prepared commercially or extracted from cashew nut oil. The epoxy resins derived from cashew nut oil, when cured, are flexible without modification. Epoxy resins derived from epichlorhydrin and bisphenol A yield essentially rigid products when reacted with curing agents, such as polyfunctional aliphatic or aromatic amines, acid anhydrides, etc. A certain degree of flexibility and toughness is obtained by curing these epoxy resins with polyamides, such as Versamid 125 and Versamid 140, marketed by General Mills, Inc. These epoxy resins derived from epichlorhydrin and bisphenol A can be flexibilized further by modifying them before curing with high percentages of additives, such as polysulfides and polyethylene glycols. They can also be flexibilized by blending with the epoxy resin extracted from cashew nut oil. Examples of polysulfides are Thiokol LP2, LP3, LP8, and LP33, marketed by Thiokol Corporation. An example of flexible cashew nut oil epoxy resin is Cardolite NC 513, marketed by Irvington Varnish Company. These epoxy resins, after being modified as described above, can be cured to form a tough, flexible interlayer with polyamine curing agents, such as diethylene triamine, metaphenylene diamine, diamino-diethyl-propylamine, etc.

The useful flexible acrylic resins may be defined as slightly to moderately cross linked higher alkyl acrylates and methacrylates such as polyethyl and butyl methacrylate.

The laminates of this invention will include at least three components including at least two outer skins and at least one intermediate layer. Also, a multiplicity of plies may be used to perform various functions. In preparing the laminates, each such ply must be separated from the adjacent ply by means of at least one of the described flexible intermediate layers.

The exterior skins may be of any desired thickness. For example, the skins may be as thin as one sixty-fourth of an inch and may be as thick as a half inch or more. The thickness of the outer skin will depend upon the use for the laminate. The inner or opposite skin may also range in thickness from very thin, e.g., one sixty-fourth of an inch, to reasonably thick compositions, e.g., one-half inch or more. This is particularly true in the fabrication of aircraft parts where the outer skin must withstand thermal distortion and elemental erosion. The thickness of the flexible resin intermediate layer is quite critical. It must be substantially thicker than a mere adhesive. For example, the inner layer should be at least one sixty-fourth of an inch thick in order to withstand the thermal distortion created by changes in the temperature of the laminate and may be as thick as three-fourths of an inch. Preferably, the inter layer should be from one-sixteenth inch to one-fourth inch thick.

The laminates of this invention are prepared by fabricating the skins in any known manner. For example, skins may be shaped from previously prepared materials such as various resins and glass by heating them and shaping them to a form. Such skins may also be prepared by molding in a customary mold at customary molding temperatures. In preparing the laminates, the prepared skins are held in spaced-apart relationship by means of various spacers or gaskets which maintain a cavity between the skins which is equivalent in depth to the desired thickness of the inner layer. The spacers should be inert to the casting resin and may be made from such materials as plastic coated metal, polytetrafluoroethylene, silicone rubber, polyethylene rubber, and extruded nylon. Thereafter, a fluidized thermosetting casting resin may be poured or forced into the cavity between the skins after which the laminate assembly is sealed and cured.

One preferred procedure of filling the cavity is to vertically suspend the spaced-apart, spacer-sealed sandwich with the surface plane of the skins being in a plane substantially normal to earth horizontal. A vent opening is provided midpoint in top spacer and an inlet opening near the bottom of the cavity, e.g., in the bottom spacer. The viscous flowable resinous inner layer material is then slowly injected in the inlet and the cavity filled from the bottom upward until the resinous material begins to fill the top vent. Such procedure, referred to as flooding, results in an easily controllable casting procedure giving a void-free interposed layer.

Curing may be effected at room temperature, e.g., 70° F., but customarily the curing temperatures will be elevated but maintained below about 300° F. When one or more of the components of the laminate is an acrylic material, a somewhat lower curing temperature, e.g., below 200° F., is necessary to prevent thermal relaxation.

The conditions of curing, e.g., time, temperature and pressure, are known in the art and will depend on the resins being cured. Normally, the temperature will be from room temperature to 300° F., the time from a few minutes, e.g., 10 minutes to several hours, e.g., 72 hours, and the pressure will range from none to 25 pounds per square inch.

The following examples are used to illustrate the invention and are not intended to limit the scope of the invention.

*Example 1*

A 12" by 12" flat panel laminate was made in the following manner. An outer skin was cut from a sheet of stretched Plexiglas-55 which was 0.350 inch thick. While Plexiglas is generally classed as a polymer of methylmethacrylate, Plexiglas-55 is a polymer of methylmethacrylate modified with a small amount, usually less than 2% by weight, of a cross-linking monomer. When the word "stretched" is used in describing Plexiglas, such term means that a sheet of such material has been cast and then it is stretched to orient the molecules in the sheet. A second outer skin was cut from a sheet of Sierracin 880 (a commercial mixture of styrene and polyester obtained by reacting an unsaturated dibasic acid such as maleic or fumaric with a glycol such as ethylene glycol or propylene glycol) which was 0.125 inch thick. The outer skins were cleaned and held in spaced-apart relation by means of a bronze welding rod coated with a silicone rubber. This spacer was bent about the periphery of the outer skins. Around the edge of the silicone rubber, a commercial bag-sealing compound was used to insure the seal. This assembly was taped together by means of Scotch (plasticized cellulose) tape. An outer skin was reinforced by means of an aluminum plate 0.250 inch thick and the entire assembly was held together by means of C-clamps. The assembly was placed in a vertical position with the unsealed edge at the top. The vertical edges were clamped together with 15-pound spring clamps positioned side by side. Thereafter, the interlayer casting resin was prepared by mixing the following: 500 grams of Paraplex P-13 (50% by weight of styrene and 50% by weight of a polyester made by reacting maleic acid or maleic anhydride with adipic acid and any of the various diols such as ethylene glycol) and 10 grams of Luperco ATC paste (a mixture of 50 parts benzoyl peroxide in 50 parts tricresyl phosphate). This mixture was flooded into the panel assembly. After casting, the assembly was let stand for 30 minutes in order to allow air bubbles to migrate to the top and escape. When all of the air had been removed, the assembly was placed in a circulating air oven at 150° F. for a period of 19.5 hours. Thereafter, the panel assembly was removed from the oven, the clamps removed, and the panel tested. The finished panel was transparent and displayed excellent optical qualities with no distortion and the panel contained no observable imperfections. A specimen was cut from the panel and tested for adhesion. It was found that the skin layers would fracture before the surface areas would separate.

*Example 2*

The general procedure outlined in Example 1 was used to fabricate another 12" x 12" flat panel. The interlayer casting resin was made from a mixture of 300 grams DER-332 (a fluidized epoxy resin), 300 grams of Thiokol LP-8 (a liquid polythiodithiol polymer prepared from 98 mol percent of bis(2-chloroethyl)formal and 2 mol percent of trichloro propane) and 30 grams of diethylene triamine. Prior to mixing, the epoxy and polysulfide resins were warmed separately for three and one-half hours at 150° F. Thereafter, the resins and diethylene triamine were blended together and flooded into the cavity to form the interlayer. The entire assembly was cured for 18 hours at room temperature followed by 2½ hours in a circulating air oven at 150° F. Tests indicated that adhesion was good although the laminate had a slight yellow discoloration.

*Example 3*

The procedure of Example 1 was repeated using an interlayer casting resin consisting of 570 grams ethyl methacrylate, 30 grams ethylene glycol dimethacrylate, and 15 grams Luperco CDB (50% 1,1 dichloro benzoyl peroxide and 50% dibutyl phthalate). After thorough mixing, the interlayer casting resin was flooded into the assembly and cured for 19 hours in a circulating air oven at 120° F. Although the interlayer was clear and flexible, there was some evidence of shrinkage.

*Example 4*

A canopy was prepared using the procedure and compositions disclosed in Example 1. In this canopy the Sierracin 880 outer skin was 0.125 inch thick and was not reinforced with an aluminum plate. The canopy displayed the same desirable properties indicated in Example 1.

*Example 5*

The procedure and compositions of Example 1 were used to construct a panel except that a polytetrafluoroethylene gasket was used to provide a space for casting the interlayer resin which was 0.25 inch thick. The results were equivalent to those obtained in Example 1.

*Example 6*

The procedures and compositions of Example 5 were used to construct a panel except that the interlayer was one-eighth inch thick. The results were equivalent to those obtained in the previous examples.

Example 7

The procedure and compositions of Example 6 were used to prepare a panel except that the Sierracin 880 outer skin was 0.25 inch thick. The results of this test were equivalent to those obtained in the previous examples.

Example 8

A test panel was constructed according to the procedure of Example 1. The inner skin was cut from a sheet of stretched polymethylmethacrylate (Plexiglas-55) which was 0.350 inch thick. The outer skin was cut from a sheet of a polyester resin made from an unsaturated dibasic acid such as maleic acid and a glycol such as propylene glycol combined with a monomer such as divinyl benzene (Sierracin 880) which was 0.125 inch thick. The flexible resinous intermediate layer was comprised of a mixture of 50% by weight of an epoxy resin (Epirez 504) and 50% by weight of a liquid polythiol dithiol polymer prepared from 98 mol percent of bis(2-chloroethyl)formal and 2 mol percent of trichloropropane (Thiokol LP8). The resin mixture contained 50% by weight of diethylene triamine as a curing agent. The intermediate layer was cast to a thickness of 0.10 inch. The panel was cured at 150° F. for a period of 18 hours. The finished laminate was a pale yellow, transparent laminate which displayed excellent adhesion between the plies and excellent optical transmission properties.

The following examples are intended to further illustrate the invention and are not intended as limitations thereon. The examples illustrated in the tables were in the nature of test panels about 4″ x 4″ square. The indicated skin compositions were prepared in a customary manner and were usually cut from commercial sheets. The interior faces of the outer skins were cleaned by washing with detergents and/or solvents. Obviously, a cleaning composition must be selected which will not attack the skin being cleaned. Thereafter, spacers or gaskets were inserted between the previously prepared skins and the assembly clamped together. The gasketing material was selected from materials which were inert to the intermediate casting resins. The following spacer materials were used in one or more of the test samples: Polytetrafluoroethylene, silicone rubber, polyethylene, extruded nylon, and plastic covered steel spacers. If a substantially air-tight seal was not created by the gaskets, a sealing compound was used to make the assembly air-tight, leaving only a small opening for insertion of the inner layer casting resin. The assemblies were put under slight pressure by means of the clamps in order to prevent leakage around the gaskets, to maintain uniform interlayer thickness throughout the laminated panel, to keep the interlayer and outer skins or shells in intimate contact throughout the curing cycle, and to compensate for shrinkage of the resin inner layer. In fabricating larger articles, pressure may be maintained by compressed air, fluid pressure, vacuum, and spring tension. After the panel assemblies were prepared, the interlayer casting resins were mixed and transferred into the cavities. Customarily, the mixed resin was exposed to a vacuum prior to being inserted between the skins in order to remove any occluded or dissolved air. Also, a vacuum may be used to remove any residual air after the resins are poured into the panel assemblies. Transfer of the resins into the cavity between the outer skins was accomplished by pouring, flooding, or by pressure injection. Thereafter, the panel assemblies were cured by heating in an oven as indicated in the tables.

TABLE NO. 1

| Example | Inner skin thickness, inches | Outer skin Material | Outer skin Thickness, inches | Color | Degree of adhesion | Remarks |
|---|---|---|---|---|---|---|
| 1 | 0.350 | Sierracin 880 | 0.125 | Colorless | Excellent | Optically transparent. |
| 2 | 0.250 | Sierracin 890 | 0.250 | Pale yellow | do | Do. |
| 3 | 0.350 | Stretched Sierracin RC-500. | 0.125 | Colorless | do | Decorative shrink-back in outer skin. |
| 4 | 0.250 | Selectron 400 | 0.250 | Pale yellow | do | Optically transparent. |
| 5 | 0.250 | Double strength window glass. | 0.125 | Colorless | Moderate | Do. |

NOTE.—On all the above laminates, the inner skin was stretched Plexiglas 55 and the interposed layer was Paraplex P-13 having a thickness of 0.100 inch. Benzoyl peroxide (1%) was the curing agent and the laminates were all cured at 150 degrees Fahrenheit for 18 hours.

TABLE NO. 2

| Example | Inner skin thickness, inches | Outer skin Material | Outer skin Thickness, inches | Color | Degree of adhesion | Remarks |
|---|---|---|---|---|---|---|
| 6 | 0.350 | Sierracin 880 | 0.125 | Colorless | Excellent | Optically transparent. |
| 7 | 0.250 | Sierracin 890 | 0.250 | Pale yellow | do | Do. |
| 8 | 0.350 | Stretched Sierracin RC 500. | 0.125 | Colorless | do | Mild haze in outer skin. |
| 9 | 0.250 | Selectron 400 | 0.250 | Yellow | do | Optically transparent. |
| 10 | 0.250 | Plexiglas II | 0.250 | Colorless | do | Mild haze in outer skin. |
| 11 | 0.250 | Rohm & Haas 610XP | 0.250 | Pale yellow | Moderate | Optically transparent. |
| 12 | 0.250 | Polymer K | 0.200 | Colorless | do | Do. |
| 13 | 0.350 | Double strength window glass. | 0.125 | do | do | Do. |

NOTE.—On all the above laminates, the inner skin was stretched Plexiglas 55 and the interposed layer was Selectron 5208 having a thickness of 0.100 inch. Benzoyl peroxide (1%) was the curing agent and the laminates were all cured at 150 degrees Fahrenheit for 18 hours.

TABLE NO. 3

| Example | Inner skin thickness, inches | Outer skin Material | Outer skin Thickness, inches | Color | Degree of adhesion | Remarks |
|---|---|---|---|---|---|---|
| 14 | 0.350 | Sierracin 880 | 0.125 | Colorless | Excellent | Optically Transparent. |
| 15 | 0.250 | Sierracin 890 | 0.250 | Pale yellow | ___do___ | Do. |
| 16 | 0.350 | Stretched Sierracin RC 500. | 0.125 | Colorless | ___do___ | Decorative shrink-back in outer skin. |
| 17 | 0.350 | Selectron 400 | 0.250 | Yellow | ___do___ | Optically transparent. |
| 18 | 0.350 | Polymer K | 0.200 | Colorless | Moderate | Do. |

NOTE.—On all the above laminates, the inner skin was stretched Plexiglas 55 and the interposed layer was Marco MR-30V having a thickness of 0.100 inch. Benzoyl peroxide (1%) was the curing agent and the laminates were all cured at 150 degrees Fahrenheit for 20 hours.

TABLE NO. 4

| Example | Inner skin thickness, inches | Outer skin Material | Outer skin Thickness, inches | Color | Degree of adhesion | Remarks |
|---|---|---|---|---|---|---|
| 19 | 0.350 | Sierracin 880 | 0.125 | Colorless | Excellent | Optically transparent. |
| 20 | 0.250 | Sierracin 890 | 0.250 | Yellow | ___do___ | Do. |
| 21 | 0.350 | Stretched Sierracin RC 500. | 0.125 | Transparent | ___do___ | Decorative shrink-back in outer skin. |
| 22 | 0.250 | Selectron 400 | 0.250 | Yellow | ___do___ | Optically transparent. |

NOTE.—On all the above laminates, the inner skin was stretched Plexiglas 55 and the interposed layer was Stypol 12 having a thickness of 0.100 inch. Benzoyl peroxide (1%) was the curing agent and the laminates were all cured at 150 degrees Fahrenheit for 18 hours.

TABLE NO. 5

| Example | Inner skin thickness, inches | Outer skin Material | Outer skin Thickness, inches | Color | Degree of adhesion | Remarks |
|---|---|---|---|---|---|---|
| 23 | 0.350 | Sierracin 880 | 0.125 | Transparent | Excellent | Decorative shrink-back in inner skin. |
| 24 | 0.250 | Sierracin 890 | 0.250 | Yellow | ___do___ | Optically transparent. |
| 25 | 0.350 | Stretched Sierracin RC-500. | 0.125 | Transparent | ___do___ | Decorative shrink-back in both skins. |
| 26 | 0.250 | Selectron 400 | 0.250 | Yellow | ___do___ | Optically transparent. |

NOTE.—On all the above laminates, the inner skin was stretched Plexiglas 55 and the interposed layer was Vibrin 121 having a thickness of 0.100 inch. Benzoyl peroxide (1%) was the curing agent and the laminates were all cured at 150 degrees Fahrenheit for 18 hours.

TABLE NO. 6

| Example | Inner skin thickness, inches | Outer skin Material | Outer skin Thickness, inches | Color | Degree of adhesion | Remarks |
|---|---|---|---|---|---|---|
| 27 | 0.350 | Sierracin 880 | 0.125 | Transparent | Excellent | Optically transparent. |
| 28 | 0.250 | Sierracin 890 | 0.250 | Yellow | ___do___ | Do. |
| 29 | 0.350 | Stretched Sierracin RC 500. | 0.125 | Transparent | ___do___ | Do. |
| 30 | 0.250 | Selectron 400 | 0.250 | Yellow | ___do___ | Do. |
| 31 | 0.250 | Rohm & Haas 610XP | 0.250 | ___do___ | ___do___ | Do. |
| 32 | 0.250 | Polymer K | 0.200 | Colorless | Moderate | Do. |

NOTE.—On all the above laminates, the inner skin was stretched Plexiglas 55 and the interposed layer was Hetron X-42 having a thickness of 0.100 inch. Benzoyl peroxide (1%) was the curing agent and the laminates were all cured at 150 degrees Fahrenheit for 18 hours.

TABLE NO. 7

| Example | Inner skin thickness, inches | Outer skin Material | Outer skin Thickness, inches | Color | Degree of adhesion | Remarks |
|---|---|---|---|---|---|---|
| 33 | 0.350 | Sierracin 880 | 0.125 | Colorless | Excellent | Optically transparent. |
| 34 | 0.250 | Sierracin 890 | 0.250 | Yellow | ___do___ | Do. |
| 35 | 0.350 | Stretched Sierracin RC 500. | 0.125 | Colorless | ___do___ | Do. |
| 36 | 0.250 | Selectron 400 | 0.250 | Yellow | ___do___ | Do. |
| 37 | 0.350 | Polymer K | 0.200 | Colorless | Moderate | Do. |

NOTE.—On all the above laminates, the inner skin was stretched Plexiglas 55 and the interposed layer was Interchemical IC-401 having a thickness of 0.100 inch. Benzoyl peroxide (1%) was the curing agent and the laminates were all cured at 150 degrees Fahrenheit for 20 hours.

TABLE NO. 8

| Example | Inner skin thickness, inches | Outer skin | | Color | Degree of adhesion | Remarks |
|---|---|---|---|---|---|---|
| | | Material | Thickness, inches | | | |
| 38 | 0.350 | Sierracin 880 | 0.125 | Colorless | Excellent | Optically transparent. |
| 39 | 0.350 | Sierracin 890 | 0.250 | Yellow | do | Do. |
| 40 | 0.350 | Stretched Sierracin RC 500. | 0.125 | Colorless | do | Decorative shrink-back in outer skin. |
| 41 | 0.250 | Selectron 400 | 0.250 | Yellow | do | Optically transparent. |
| 42 | 0.250 | Rohm & Haas 610XP | 0.250 | do | do | Do. |
| 43 | 0.350 | Polymer K | 0.200 | Colorless | do | Do. |

NOTE.—On all the above laminates, the inner skin was stretched Plexiglas 55 and the interposed layer was Laminac 4134 having a thickness of 0.100 inch. Benzoyl peroxide (1%) was the curing agent and the laminates were all cured at 150 degrees Fahrenheit for 20 hours.

TABLE NO. 9

| Example | Inner skin thickness, inches | Outer skin | | Color | Degree of adhesion | Remarks |
|---|---|---|---|---|---|---|
| | | Material | Thickness, inches | | | |
| 44 | 0.350 | Sierracin 880 | 0.125 | Colorless | Excellent | Optically transparent. |
| 45 | 0.350 | Sierracin 890 | 0.250 | Yellow | do | Do. |
| 46 | 0.250 | Stretched Sierracin RC 500. | 0.125 | Colorless | do | Decorative shrink-back in outer skin. |
| 47 | 0.250 | Plexiglas II | 0.250 | do | do | Optically transparent. |
| 48 | 0.250 | Selectron 400 | 0.250 | Yellow | do | Do. |
| 49 | 0.250 | Rohm & Haas 610XP | 0.250 | do | Moderate | Do. |

NOTE.—On all the above laminates, the inner skin was stretched Plexiglas 55 and the interposed layer was Glidpol 2002 having a thickness of 0.100 inch. Benzoyl peroxide (1%) was the curing agent and the laminates were all cured at 150 degrees Fahrenheit for 20 hours.

TABLE NO. 10

| Example | Inner skin thickness, inches | Outer skin | | Color | Degree of adhesion | Remarks |
|---|---|---|---|---|---|---|
| | | Material | Thickness, inches | | | |
| 50 | 0.350 | Sierracin 880 | 0.125 | Colorless | Excellent | Optically transparent. |
| 51 | 0.250 | Sierracin 890 | 0.250 | Yellow | do | Do. |
| 52 | 0.350 | Stretched Sierracin RC 500. | 0.125 | Colorless | do | Decorative shrink-back in outer skin. |
| 53 | 0.250 | Selectron 400 | 0.250 | Yellow | do | Optically transparent. |
| 54 | 0.250 | Rohm & Haas 610XP | 0.250 | do | Moderate | Do. |

NOTE.—On all the above laminates, the inner skin was stretched Plexiglas 55 and the interposed layer was Marco MR 30C having a thickness of 0.100 inch. Benzoyl peroxide (1%) was the curing agent and the laminates were all cured at 150 degrees Fahrenheit for 18 hours.

TABLE NO. 11

| Example | Inner skin thickness, inches | Outer skin | | Color | Degree of adhesion | Remarks |
|---|---|---|---|---|---|---|
| | | Material | Thickness, inches | | | |
| 55 | 0.350 | Sierracin 880 | 0.125 | Colorless | Moderate | Optically transparent. |
| 56 | 0.250 | Sierracin 890 | 0.250 | Yellow | do | Do. |
| 57 | 0.350 | Stretched Sierracin RC 500. | 0.125 | Colorless | do | Do. |
| 58 | 0.250 | Selectron 400 | 0.250 | Yellow | do | Do. |

NOTE.—On all the above laminates, the inner skin was stretched Plexiglas 55 and the interposed layer was Polylite 8120 having a thickness of 0.100 inch. Benzoyl peroxide (1%) was the curing agent and the laminates were all cured at 150 degrees Fahrenheit for 18 hours.

TABLE NO. 12

| Example | Inner skin thickness, inches | Outer skin | | Color | Degree of adhesion | Remarks |
|---|---|---|---|---|---|---|
| | | Material | Thickness, inches | | | |
| 59 | 0.350 | Sierracin 880 | 0.125 | Colorless | Excellent | Optically transparent. |
| 60 | 0.250 | Sierracin 890 | 0.250 | Yellow | do | Do. |
| 61 | 0.350 | Stretched Sierracin RC 500. | 0.125 | Colorless | do | Decorative shrink-back in outer skin. |
| 62 | 0.250 | Selectron 400 | 0.250 | Yellow | do | Optically transparent. |
| 63 | 0.250 | Double strength window glass. | 0.125 | Colorless | Moderate | Do. |

NOTE.—On all the above laminates, the inner skin was stretched Plexiglas 55 and the interposed layer was Selectron 5214 having a thickness of 0.100 inch. Benzoyl peroxide (1%) was the curing agent and the laminates were all cured at 150 degrees Fahrenheit for 18 hours.

TABLE NO. 13

| Example | Inner skin thickness, inches | Outer skin | | Color | Degree of adhesion | Remarks |
|---|---|---|---|---|---|---|
| | | Material | Thickness, inches | | | |
| 64 | 0.250 | Sierracin 880 | 0.125 | Pale Yellow | Excellent | Optically transparent. |
| 65 | 0.250 | Sierracin 890 | 0.250 | Yellow | do | Do. |
| 66 | 0.350 | Stretched Sierracin RC 500. | 0.125 | Pale Yellow | do | Do. |
| 67 | 0.250 | Selectron 400 | 0.250 | Yellow | do | Do. |
| 68 | 0.250 | Rohm & Haas 610XP | 0.250 | do | do | Do. |
| 69 | 0.250 | Polymer K | 0.200 | Pale Yellow | do | Do. |
| 70 | 0.350 | Double strength window Glass. | 0.125 | do | Good | Do. |

NOTE.—On all the above laminates, the inner skin was stretched Plexiglas 55 and the interposed layer was Dow DER X-2640.2 having a thickness of 0.100 inch. Diethylene Triamine (10%) was the curing agent and the laminates were all cured at 150 degrees Fahrenheit for 65 hours.

TABLE NO. 14

| Example | Inner skin thickness, inches | Outer skin | | Color | Degree of adhesion | Remarks |
|---|---|---|---|---|---|---|
| | | Material | Thickness, inches | | | |
| 71 | 0.350 | Sierracin 880 | 0.125 | Pale brown | Excellent | Optically transparent. |
| 72 | 0.250 | Sierracin 890 | 0.250 | do | do | Do. |
| 73 | 0.350 | Stretched Sierracin RC 500. | 0.125 | do | do | Do. |
| 74 | 0.250 | Selectron 400 | 0.250 | Yellowish brown. | do | Do. |
| 75 | 0.250 | Rohm & Haas 610XP | 0.250 | Pale brown | do | Do. |
| 76 | 0.250 | Polymer K | 0.200 | do | do | Do. |
| 77 | 0.250 | Double strength window glass. | 0.125 | do | do | Do. |

NOTE.—On all the above laminates, the inner skin was stretched Plexiglas 55 and the interposed layer was 50% Dow DER 332 mixed with 50% Thiokol LP-8 having a thickness of 0.100 inch. Diethylene triamine (5%) was the curing agent and the laminates were all cured at 150 degrees Fahrenheit for 16 hours.

TABLE NO. 15

| Example | Inner skin thickness, inches | Outer skin | | Color | Degree of adhesion | Remarks |
|---|---|---|---|---|---|---|
| | | Material | Thickness, inches | | | |
| 78 | 0.350 | Sierracin 880 | 0.125 | Yellow | Excellent | Optically transparent. |
| 79 | 0.250 | Sierracin 890 | 0.250 | do | do | Do. |
| 80 | 0.350 | Stretched Sierracin RC 500. | 0.125 | do | do | Do. |
| 81 | 0.250 | Selectron 400 | 0.250 | do | do | Do. |
| 82 | 0.250 | Rohm & Haas 610XP | 0.250 | do | do | Do. |
| 83 | 0.250 | Polymer K | 0.200 | do | do | Do. |
| 84 | 0.350 | Double strength window glass. | 0.125 | do | do | Do. |

NOTE.—On all the above laminates, the inner skin was stretched Plexiglas 55 and the interposed layer was 50% Dow DER 332 mixed with 50% Versamide 140 having a thickness of 0.100 inch. No curing agent was used and the laminates were all cured at 150 degrees Fahrenheit for 65 hours.

The trademarked materials used in examples illustrated in Tables 1 through 15, which are not previously described, may be defined in the following manner. Marco MR-30 V, Marco MR-30 C, Stypol 12, Vibrin 121, Hetron X-42, Interchemical IC-401, Laminac 4134, Glidpol 2002, Polylite 8120, and Selectron 5214 are flexible resins comprised of a mixture of about 50% by weight of styrene and about 50% by weight of a polyester made from adipic acid, maleic anhydride and diethylene glycol or equivalent compounds. Dow DER X-2640.2 is a flexible epoxy resin. Sierracin RC-500 and Plexiglas II are rigid polymethylmethacrylate resins.

In preparing the laminates of this invention the various resins may be modified in accordance with procedures known in the art. For example, curing agents such as the various organic peroxides and polyamides may be added, accelerators such as the various sulfenamides, thiocarbonates and disulfides may be added and bleaching agents such as the inorganic peroxides may be added to the flexible casting resins, if desired. Also, the various resins used to fabricate the skins or the interlayers may be homogeneous compositions or may be mixtures of one or more of the various described resins. In addition, the various resins may be reinforced in any customary manner, for example, by glass fibers, wire mesh, etc. Also, the interior skin surfaces may be coated with various materials to improve adhesion although this is customarily avoided. When either of the outer skins are made of glass, the inner surface thereof may be coated with one of the well-known silane compositions in order to improve adhesion with the inner layer. Also, the skin surfaces, particularly the inner skin surfaces, may be coated with a thin, e.g., molecular thickness, conductive coating, preferably a powdered metal which is deposited by the well-known process of vaporizing the metal in a vacuum and depositing it on the surface, e.g., by means of electrolytic disposition. When the inner surface is coated with powdered metal, it may be desirable to protect the deposited metal coating with a thin coating of a resin such as the silanes, epoxy resins, polyester resins or polymethylmethacrylate resins, etc.

Although the invention has been described in connection with aircraft and missile components, it is applicable to a wide variety of uses such as shock mounts, decorative laminates, puncture sealing container liners, and bullet resistant safety glass.

While certain representative embodiments and details have been shown for the purpose of illustrating the invention, it will be apparent to those skilled in this art that

We claim:

1. A transparent laminate having good optical properties comprised of a tough, hard, substantially rigid outer skin made from cured products of unsaturated alkyds (made by reacting unsaturated polycarboxylic acids with polyols) and styrene, and a tough, hard, rigid inner skin made from a polymethylmethacrylate adhered together in spaced apart relation by means of a tough substantially non-rigid deformable castable thermosetting resinous intermediate layer at least about one sixty-fourth inch thick made from a mixture composed about 50 percent by weight of styrene and about 50 percent by weight of a polyester made by reacting a material from the class consisting of maleic acid and maleic anhydride with a saturated acid and a diol.

2. A laminate comprised of a tough, hard, substantially rigid skin made from a mixture of unsaturated monomers and polyester resins, and a tough, hard, rigid, stretched and oriented second skin made from a polymer of methylmethacrylate modified with a small amount of a cross-linking monomer, adhered together in spaced apart relation by means of a tough substantially non-rigid deformable castable thermosetting resinous intermediate layer at least about one sixty-fourth inch thick made from a mixture composed about 50 percent by weight of styrene and about 50 percent by weight of a polyester made by reacting a material from the class consisting of maleic acid and maleic anhydride with a saturated acid and a diol.

3. A laminate comprised of a tough, hard, substantially rigid outer epoxy resin skin made from the reaction products of epichlorhydrin and bisphenol A cured by a product from the group consisting of polyfunctional amines and acid anhydrides, and a tough, hard, rigid outer skin made from a polymer of methylmethacrylate modified with a small amount of a cross-linking monomer, adhered together in spaced apart relation by means of a tough substantially non-rigid deformable castable thermosetting resinous intermediate layer at least about one sixty-fourth inch thick made from the cured product of a mixture composed about 50 percent by weight of styrene and about 50 percent by weight of a polyester made by reacting a material from the class consisting of maleic acid and maleic anhydride with a saturated acid and a diol.

4. A transparent laminate having good optical properties, comprised of a tough, hard, substantially rigid first outer skin made from a polymer of methylmethacrylate with unoriented molecules therein, and a tough, hard, rigid, stretched and molecularly oriented second outer skin made from a polymer of methylmethacrylate modified with a small amount of cross-linking monomer, adhered together in spaced apart relation by means of a tough, substantially non-rigid, deformable, castable, thermosetting resinous intermediate layer at least about one sixty-fourth inch thick made from the cured product of about 50 percent by weight of styrene mixed with about 50 percent by weight of a polyester made by reacting a material from the class consisting of maleic acid and maleic anhydride with a saturated dicarboxylic acid and a diol, said skins having good adhesion at temperatures up to 300 to 400 degrees F.

5. A transparent laminate for forming a portion of supersonic aircraft, missiles, or like articles, and having good optical properties, which laminate is comprised of a tough, hard, substantially rigid outer skin made from a material selected from the group consisting of polymers of methylmethacrylate, polymers of styrene, polymers of allyl glycol carbonate, copolymers of allyl diglycol carbonate and acrylic monomers, cured products of unsaturated alkyds made by reacting unsaturated polycarboxylic acids with polyols and unsaturated cross-linking monomers, and hard, rigid epoxy resins that are the reaction products of epichlorhydrin and bisphenol A cured by a product from the group consisting of polyfunctional amines and polycarboxylic acid anhydrides; said first outer skin being adapted to resist heat distortion at least up to temperatures of about 400° F. and being adapted to form a part of the outer surface of the article; and a shatter resistant, strong, second skin made from a stretched polymer of methylmethacrylate modified with a small amount of a cross-linking monomer adhered together in spaced apart relation by means of a tough, substantially non-rigid, deformable, castable, thermosetting resinous intermediate layer at least about 1/64 inch thick made from the cured polymerized product of a mixture composed about 50 percent by weight of styrene and about 50 percent by weight of a polyester made by reacting a material from the class consisting of maleic acid and maleic anhydride with a saturated dicarboxylic acid and a diol; said second outer skin being adapted to form part of the inner surface of the article.

6. A transparent laminate for forming a portion of supersonic aircraft, missiles, or like articles, and having good optical properties, which laminate is comprised of a tough, hard, substantialy rigid outer skin made from a material selected from the group consisting of polymers of methylmethacrylate, polymers of styrene, polymers of allyl glycol carbonate, copolymers of allyl diglycol carbonate and acrylic monomers, cured products of unsaturated alkyds made by reacting unsaturated polycarboxylic acids with polyols and unsaturated cross-linking monomers, and hard, rigid epoxy resins that are the reaction products of epichlorhydrin and bisphenol A cured by a product from the group consisting of polyfunctional amines and polycarboxylic acid anhydrides; said first outer skin being adapted to resist heat distortion at least up to temperatures of about 400° F. and being adapted to form part of the outer surface of the article; and a shatter resistant, strong, second skin made from a stretched polymer of methylmethacrylate modified with a small amount of a cross-linking monomer adhered together in spaced apart relation by means of a tough, substantially non-rigid, deformable, castable, thermosetting resinous intermediate layer at least about 1/64 inch thick made from the cured polymerized product of a mixture of about 50 percent by weight of styrene and about 50 percent by weight of a polyester made from maleic anhydride, adipic acid and ethylene glycol; said second outer skin being adapted to form part of the inner surface of the article.

References Cited in the file of this patent

UNITED STATES PATENTS

| | | |
|---|---|---|
| 1,777,309 | Hopkinson | Oct. 7, 1930 |
| 2,047,253 | Brooks | July 14, 1936 |
| 2,062,088 | Dreyer | Nov. 24, 1936 |
| 2,176,997 | Marini | Oct. 24, 1939 |
| 2,184,876 | Sherts | Dec. 26, 1939 |
| 2,322,310 | Muskat et al. | June 22, 1943 |
| 2,444,059 | Neher et al. | June 29, 1948 |
| 2,451,935 | Foster | Oct. 19, 1948 |
| 2,585,115 | Greenlee | Feb. 12, 1952 |
| 2,604,668 | Miller et al. | July 29, 1952 |
| 2,632,722 | Libberton | Mar. 24, 1953 |
| 2,710,274 | Kuehl | June 7, 1955 |
| 2,784,926 | Bonza et al. | Mar. 12, 1957 |
| 2,920,352 | Miller et al. | Jan. 12, 1960 |

FOREIGN PATENTS

| | | |
|---|---|---|
| 783,555 | Great Britain | Sept. 25, 1957 |

OTHER REFERENCES

"Polyesters and Their Applications," by Bjorksten Research Laboratories, Inc., Reinhold Publishing Company, New York (1956), pages 137, 157 and 163 to 169 relied upon.